(12) United States Patent
Frene

(10) Patent No.: US 6,570,882 B1
(45) Date of Patent: May 27, 2003

(54) METHOD OF MANAGING A QUEUE OF DIGITAL CELLS

(75) Inventor: Patrick Frene, Vanves (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/373,239

(22) Filed: Aug. 12, 1999

(30) Foreign Application Priority Data

Aug. 13, 1998 (FR) ............................................. 98 09915

(51) Int. Cl.[7] ............................................. H04L 12/56
(52) U.S. Cl. .................. 370/412; 370/395.42; 370/428; 370/389; 710/54
(58) Field of Search ................................. 370/412, 229, 370/235, 411, 414, 416–418, 428, 429, 395.1, 395.31, 389, 444, 395.42, 474; 713/502; 710/52, 54; 379/266

(56) References Cited

U.S. PATENT DOCUMENTS

| 5,748,614 A | * | 5/1998 | Wallmeier | 370/395.41 |
| 5,920,568 A | * | 7/1999 | Kurita et al. | 370/412 |
| 6,389,031 B1 | * | 5/2002 | Chao et al. | 370/412 |

FOREIGN PATENT DOCUMENTS

| EP | 0 632 622 A1 | 1/1995 |
| EP | 0 710 046 A2 | 5/1996 |
| EP | 0 782 303 A2 | 7/1997 |
| GB | 2 324 678 A | 10/1998 |

OTHER PUBLICATIONS

F. Chiussi et al, "Implementing Fair Queueing in ATM Switches—Part 2, The Logarithmic Calendar Queue" IEEE Global Telecommunications Conference, Phoenix, Arizona, Nov. 3–8, 1997, vol. 1, Nov. 3, 1997, pp. 519–525, XP000737586, Institute of Electrical and Electronics Engineers.

* cited by examiner

Primary Examiner—Dang Ton
Assistant Examiner—Tri Phan
(74) Attorney, Agent, or Firm—Sughrue Mion, PLLC

(57) ABSTRACT

A method for managing a queue of cells received from a plurality of sources, wherein the last cell received is stored at a receive address in a buffer, and a time stamp is established for the last cell received that represents the theoretical time it is to leave the queue. The receive address is inserted into a programmer at a location identified by the time stamp of the last cell received, and an occupancy bit associated with the time stamp is set to an active state. The first cell(s) to leave the queue from the first active occupancy bit following that of the cell that has just left the queue is determined, with the occupancy bits being classified in increasing order of the associated time stamps, and the occupancy bit of the first cell is set to an inactive state when it leaves the queue.

12 Claims, 1 Drawing Sheet

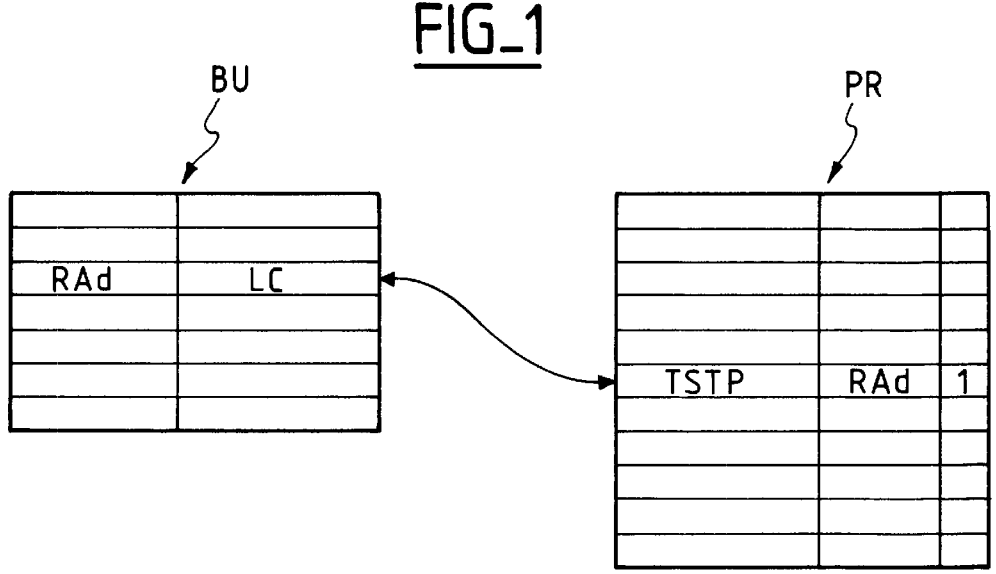
FIG_1
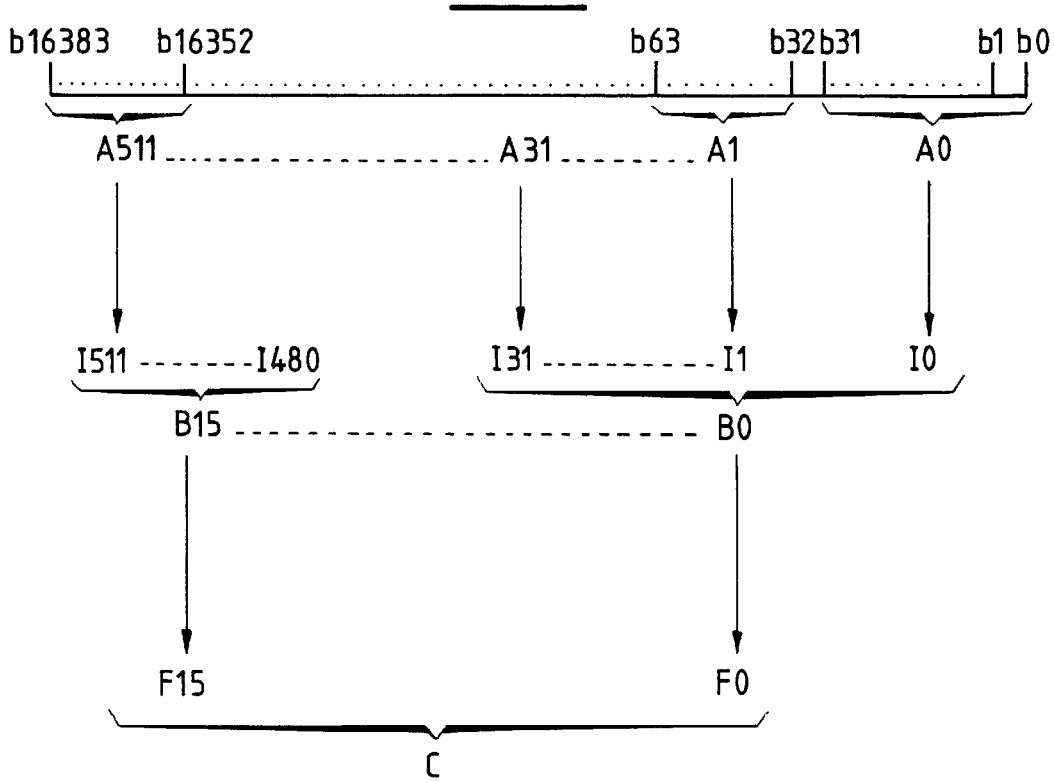
FIG_2

METHOD OF MANAGING A QUEUE OF DIGITAL CELLS

The present invention concerns a method of managing a queue of digital cells.

BACKGROUND OF THE INVENTION

In the field of digital transmission, the objective of a method of the above kind is to determine, for data or cells received from various sources, the order in which the cells are to be forwarded to an external unit.

The order in which the various cells are forwarded can naturally differ from that in which they are received. This operation of classifying the received cells is generally called queue management.

Queue management relies on a priority level of each source, priority level often being a function of the rate at which the sources send successive cells.

French Patent Application No. 2 715 258 proposes a data sorting system for queue management of the above type. The system comprises a down column of chained registers for storing the data, the first register of the column being adapted to receive the data to be classified. It also comprises an up column of chained registers, the last register of this column containing the data to be forwarded. Each register of the up column is also associated with a register of the down column in a one-to-relationship and classification is effected by exchanging data stored in the registers of the down column with data stored in the registers of the up column. Without going into how this register works in detail, it is clear that managing the transfer of data between the interconnected registers represents some degree of complexity because of the stepwise progress of the data in each column.

Transferring each item of data requires a number of transfers corresponding to the number of registers that the data must pass through. It follows that the greater the number of registers in each column, the greater the cost of this operation in terms of the number of transfers.

OBJECTS AND SUMMARY OF THE INVENTION

The aim of the present invention is therefore to provide a queue management method requiring a limited number of operations to classify cells. It is particularly well suited to relatively long queues.

The method of the invention for managing a queue of cells received from a plurality of sources comprises the following steps:
storing the last cell received at a receive address in a buffer, and
establishing for the last cell received a time stamp representing the theoretical time it is to leave the queue,
and the method further comprises the following steps:
inserting the receive address in a programmer at a location identified by the time stamp of the last cell received,
setting an occupancy bit associated with the time stamp to an active state,
determining the first cell(s) to leave the queue from the first active occupancy bit following that of the cell that has just left the queue, the occupancy bits being classified in increasing order of the associated time stamps, and
setting the occupancy bit of the first cell to an inactive state when it leaves the queue.

When the last cell received comes from a source assigned a priority level, the time stamp of that cell depends on the priority level.

For example, the source sends cells at a rate corresponding to an average period, the priority level corresponds to that period, and the time stamp is greater than or equal to that of the preceding cell from the source plus the period.

Moreover, the time stamp is also greater than or equal to the time stamp of the first cell.

In an advantageous implementation of the method, the successive occupancy bits are grouped into words and a flag is established for each of these words which has the value 0 when all the bits of the words are inactive and which has the value 1 otherwise.

Moreover, the flag of the corresponding word is recalculated after setting an occupancy bit.

It is therefore possible to look for the first non-zero flag and then the first non-zero bit associated with that flag to determine the first cell(s) to leave the queue.

However, according to an additional feature, the successive flags are grouped into fields and an index is established for each of these fields which has the value 0 when all the bits of the word are inactive and which has the value 1 otherwise.

In this case, after setting an occupancy bit and recalculating the flag of the corresponding word, the index of the field comprising that flag is recalculated.

Thus, advantageously, the first non-zero index and then the first non-zero flag associated with that index and finally the first non-zero bit associated with that flag are looked for to determine the first cell(s) to leave the queue.

Also, the time stamp is preferably established modulo a predetermined capacity constant.

According to an additional feature, the programmer includes at least two pages and the first cell(s) to leave the queue are determined page by page.

In any event, the invention also covers the situation in which one of the locations of the programmer contains a chained list of addresses.

BRIEF DESCRIPTION OF THE DRAWING

The present invention emerges in more detail in the course of the following description, which is given with reference to the accompanying drawing, in which:

FIG. 1 is a diagram of the units essential to implementation of the invention, and FIG. 2 is a diagram explaining one feature of the invention.

MORE DETAILED DESCRIPTION

Referring to FIG. 1, the first step of the method stores the last cell LC received via a transmission channel at a receive address Rad in a buffer BU.

The invention uses a programmer PR which is a memory associating a data item and an occupancy bit with a time identifier that provides the means of access to the memory. All the occupancy bits are initialized to 0, which corresponds, by convention, to an inactive state.

To simplify the description, it is assumed that the various sources producing cells are assigned a priority level that depends only on the rate at which they send cells. The priority level is easily identified from the average period T between two successive cells.

The programmer PR containing the queue is adapted to store data consisting of the various addresses used in the buffer BU.

The programmer PR identifies the first cell of the queue, i.e. the one to be forwarded to an external unit. A virtual time TV is defined by convention as the value of the time identifier associated with the cell being forwarded or the last cell that was forwarded.

Accordingly, when the last cell LC is received, a time stamp TSTP associated with that cell is calculated. This time stamp takes the value of the time stamp associated with the cell previously received from the same source plus the period T of that source. However, the above method cannot be applied to reception of the first cell from a source. In this case, the value of the time stamp is fixed at that of the virtual time TV. Accordingly, the time stamp can be defined, for example, as the greater of the following two values: that of the preceding cell plus a period T or the virtual time TV. The time stamp can also be defined as the greater of the following two values: that of the preceding cell or the virtual time TV, and a period T is then added to the result.

When the time stamp TSTP has been calculated, the receive address RAd at which the last cell LC is stored in the buffer BU is stored in the programmer PR as data associated with the time identifier having the value of that time stamp TSTP.

The time stamp is naturally matched to the clock which defines the time identifiers and a weighted value is adopted for this stamp which corresponds to an integer clock value.

The occupancy bit corresponding to this time stamp is set to 1, which by convention corresponds to an active state. This bit is reset to 0 when the corresponding cell is forwarded.

It is therefore clear that the cells to be forwarded are those associated with an occupancy bit having a value of 1. These cells are additionally classified in the programmer PR in the order they are forwarded.

It is therefore necessary to search the programmer PR for the lowest value time identifier above the virtual time TV and associated with an occupancy bit at 1.

The invention proposes an advantageous method of doing this, described next with reference to FIG. 2.

The programmer PR is now arranged as two pages of 16 384 time identifiers. The time identifier is then calculated modulo 32 768, i.e. as the remainder on dividing it by 32 768. The value 32 768 corresponds to the capacity of the programmer.

A first occupancy sequence is defined and is formed of the succession of occupancy bits in the first page of the programmer PR with reference to time identifiers 0 through 16383, the least significant bit b0 of the sequence being the occupancy bit associated with time identifier 0, the next bit b1 of the sequence being the occupancy bit associated with time identifier 1, and so on.

The value 16 384 is used to break the sequence down into 512 words each of 32 bits. The first word A0 comprises bits b0 through b31, the second word A1 comprises bits b32 through b63, and so on up to the $512^{th}$ word A511, which comprises bits b16352 through b16383.

A flag Ii is defined for each word Ai and has the value 0 if all the bits bi of the word have the value 0 and the value 1 if at least one of those bits has the value 1.

The 512 flags Ii are then grouped into 16 fields each of 32 bits, the first field B0 comprising flags I0 through I31, the second field B1 comprising flags I32 through I63, and so on up to the $16^{th}$ field comprising flags I480 through I511.

For each field Bj an index Fj is defined using the same function as the above flag. Accordingly, the $j^{th}$ index Fj has the value 0 if all the flags of the $j^{th}$ field Bj have the value 0 and has the value 1 if at least one of these flags has a non-zero value.

Applying the disjunction operator to the 16 indices F15, F14, . . . F1, F0 forms a first 16-bit key C.

Note here that the words are compressed twice by the same logical operation to give the fields the first time and the key the second time. The invention naturally applies regardless of the number of compressions, which can be one or more than two.

A second occupancy sequence (not shown in the figure) is also defined and is formed by the succession of occupancy bits on the second page of the programmer PR with reference to time identifiers 16384 through 32767.

The second sequence is also broken down into 512 words each of 32 bits. The first word A512 comprises bits b16384 through b16415, the second word A513 comprises bits b16416 through b16447, and so on up to the $1023^{th}$ word A1023 which comprises bits b32736 through b32767.

Again, a flag Ii is taken which has the value 0 if all the bits bi of the word Ai have the value 0 and which has the value 1 if at least one of those bits has the value 1.

Similarly, the 512 flags Ii are then grouped into 16 fields each of 32 bits.

For each field Bj another index Fj is defined.

Applying the disjunction operator to the 16 indices F31, F30, . . . F17, F16 forms a second 16-bit key K.

A binary variable P is introduced at this point and has the value 0 if the first page must be referred to or the value 1 if the second page must be referred to. The variable P is initialized to 0.

The page identified by the variable P is examined.

If all the bits of the key of that page have the value 0, this part of the queue is empty. There is no cell to be forwarded on this page and the value of the variable P is complemented.

If the key of the page examined has a non-zero value, it is necessary to search for the cell to be forwarded first.

This page is then searched for the minimum value jm of the index i for which the index Fj is equal to 1.

The minimum value im of the index i for which the flag Ii is equal to 1 is then looked for.

Finally, the word Aim is searched for the least significant bit bk which has the value 1.

The bit bk designates the time identifier of the programmer PR which represents the head of the queue. The address associated with this time identifier is therefore that of the buffer in which the cell to be forwarded is stored.

When that cell is forwarded, the corresponding occupancy bit bk is reset to 0.

The word Aim and the field Bjm are then recalculated and finally the corresponding key is corrected, if necessary.

In the above example, the programmer has two pages because this is the simplest case. The invention naturally applies also if the number of pages is greater, in which case the skilled person will have no difficulty in adapting the method as described. For example, it is sufficient to provide a number of values for the variable P equal to the number of pages. During the forwarding procedure, if a page is empty it is necessary to move onto the next one.

As previously mentioned, the virtual time TV is also updated and takes the value of the time identifier of the cell being forwarded (the cell associated with bit bk).

To forward a new cell all that is required is to apply the forwarding procedure described above again.

When a new cell is received in the buffer BU, in addition to the operations mentioned at the beginning of this description, it may also be necessary to modify the corresponding word Ai, the corresponding field Bj and the corresponding key.

If the occupancy bit bq corresponding to the cell has the index q, the word Ar, where r=q/32−q[32], must be recalculated, the field Bs, where s=r/16−r[16] must also be recalculated and, finally, the key must be updated.

It is therefore clear that receiving or sending a cell requires a relatively small number of operations because in each case only one occupancy bit, one word Ai, one field Bj and the key are modified.

Until now, it has been considered that there is only one cell associated with a particular time stamp. It can happen that more than one cell is allocated the same time stamp, i.e. more than one cell can be associated with the same time identifier of the programmer PR. In this case, a chained list of addresses that carry the time stamp concerned is written instead of writing a single address related to that time identifier as data. Once again, this is standard practice in the art and is not described further.

Also, the invention has been described with the occupancy bits stored in the programmer PR. This is not imperative in any way and the occupancy bits could be stored in some other memory provided that they relate to the corresponding time stamps.

The invention is not limited to the embodiments described above. In particular, any means described can be replaced by equivalent means.

What is claimed is:

1. A method of managing a queue of cells received from a plurality of sources, the method comprising:

storing the last cell received at a receive address in a buffer, establishing for the last cell received a time stamp representing a theoretical time it is to leave the queue, inserting the receive address in a programmer at a location identified by the time stamp of the last cell received, setting an occupancy bit associated with the time stamp to an active state, wherein successive occupancy bits are grouped into words and a flag is established for each of these words that has the value 0 when all the bits of the words are inactive and that has the value 1 otherwise, and, after setting an occupancy bit, the flag of the corresponding word is recalculated, and successive flags are grouped into fields and an index is established for each of these fields which has the value 0 when all the bits of the word are inactive and which has the value 1 otherwise, determining the first cell(s) to leave the queue from the first active occupancy bit following that of the cell that has just left the queue, the occupancy bits being classified in increasing order of the associated time stamps, and setting the occupancy bit of the first cell to an inactive state when it leaves the queue.

2. The method according to claim 1, wherein the last cell received comes from a source assigned a priority level, and the time stamp of that cell depends on the priority level.

3. The method according to claim 2, wherein the source sends cells at a rate corresponding to an average period, the priority level corresponds to that period, and the time stamp is greater than or equal to that of the preceding cell from the source plus the period.

4. The method according to claim 3, wherein the time stamp is also greater than or equal to the time stamp of the first cell.

5. The method according to claim 1, wherein the first non-zero flag and then the first non-zero bit associated with that flag are looked for to determine the first cell(s) to leave the queue.

6. The method according to claim 1, wherein, after setting an occupancy bit and recalculating the flag of the corresponding word, the index of the field comprising that flag is recalculated.

7. The method according to claim 6, wherein the first non-zero index and then the first non-zero flag associated with that index and finally the first non-zero bit associated with that flag are looked for to determine the first cell(s) to leave the queue.

8. The method according to claim 1, wherein the time stamp is established modulo a predetermined capacity constant.

9. The method according to claim 1, wherein the programmer comprises at least two pages and the first cell(s) to leave the queue are determined page by page.

10. The method according to claim 1, wherein one of the locations of the programmer contains a chained list of addresses.

11. The method according to claim 1, wherein the occupancy bit for each time stamp is stored in the programmer.

12. The method according to claim 1, wherein the occupancy bit for each time stamp is stored in a memory other than the programmer.

* * * * *